United States Patent [19]

Okada et al.

[11] Patent Number: 5,333,501

[45] Date of Patent: Aug. 2, 1994

[54] ABNORMALITY MONITORING APPARATUS FOR A PIPELINE

[75] Inventors: Masumi Okada, Yokohama; Shingo Nagashima; Kazuo Nakamachi, both of Tokyo; Kazuo Hattori; Yoji Takanashi, both of Tokyo; Masaru Yasuda; Masami Ishikawa, both of Tokyo; Yoshiyasu Murata, Tokyo, all of Japan

[73] Assignees: Tokyo Gas Co., Ltd.; NKK Corporation, both of Tokyo, Japan

[21] Appl. No.: 838,788

[22] PCT Filed: Sep. 11, 1990

[86] PCT No.: PCT/JP90/01155

§ 371 Date: Mar. 17, 1992

§ 102(e) Date: Mar. 17, 1992

[87] PCT Pub. No.: WO91/04477

PCT Pub. Date: Apr. 4, 1991

[30] Foreign Application Priority Data

Sep. 19, 1989 [JP] Japan .................................. 1-242842
May 30, 1990 [JP] Japan .................................. 2-140218
Aug. 13, 1990 [JP] Japan .................................. 2-214148

[51] Int. Cl.⁵ .......................................... G01N 29/00
[52] U.S. Cl. .................................. 73/592; 73/40.5 A
[58] Field of Search ................... 73/40.5 A, 592, 602; 367/35; 376/252; 340/605

[56] References Cited

U.S. PATENT DOCUMENTS 3,626,750 12/1971 Talmon .................. 73/40.5 A
4,066,095 1/1978 Massa .................... 73/40.5 A
4,457,163 7/1984 Jäckle .................... 73/40.5 A

FOREIGN PATENT DOCUMENTS 0091087 10/1983 European Pat. Off. .
3726585 2/1989 Fed. Rep. of Germany ... 73/40.5 A
52-87080 7/1977 Japan .
53-5554 2/1978 Japan .
54-88186 7/1979 Japan .
57-178124 11/1982 Japan .
38652 2/1985 Japan .................... 73/592
60-49199 3/1985 Japan .
62-297741 12/1987 Japan .
37541 2/1991 Japan .................... 73/592
179231 8/1991 Japan .................... 73/592

OTHER PUBLICATIONS

Translation of DT 3726585, Feb. 1993.
Patent Abstracts of Japan, vol. 10, No. 198 (P-476) (2254) Jul. 11, 1986 & JP-A-61 041 940 (Power Reactor & Nuclear Fuel Dev. Corp.) Feb. 28, 1986.
Patent Abstracts of Japan, vol. 10, No. 64 (P-436) (2121) Mar. 14, 1986 & JP-A-60 205 229 (Hitachi Seisakusho KK) Oct. 16, 1985.
Week 8729, Jul. 29, 1987, Derwent Publications Ltd., London, GB; AN 87-205116/29 & SU-A-276 936 (Anisimov VK) Dec. 15, 1986.
Japanese Academic Society of Noise Control Engineering, Collection of Theses Reported At Technical Meeting, p. 305, Sep. 1989.
ASME/ETCE PD-vol. 31, p. 101, Jun. 1990.

Primary Examiner—Herzon E. Williams
Assistant Examiner—Nashmiya H. Ashraf
Attorney, Agent, or Firm—Frishauf, Holtz, Goodman & Woodward

[57] ABSTRACT

In an abnormality monitoring apparatus of the present invention, a plurality of detectors (13, 14) are arranged at a plurality of positions in the axial direction of a pipeline (11) to detect respective sound waves (37) propagating from a position (B) of occurrence of abnormality. The aforementioned position is calculated from a sound wave detection time difference between the detectors (13, 14) and position between the detectors (13, 14). The apparatus further includes an abnormal waveform memory unit (28) for storing the waveforms of a plurality of kinds of typical abnormal sound waves generated from abnormality on the pipeline (11). A display device (19) displays, on the same image screen, the abnormal waveform stored in the abnormal waveform memory unit and that of the sound wave detected. It is, therefore, possible for a monitoring personnel to readily identify a kind of abnormality occurred.

1 Claim, 7 Drawing Sheets

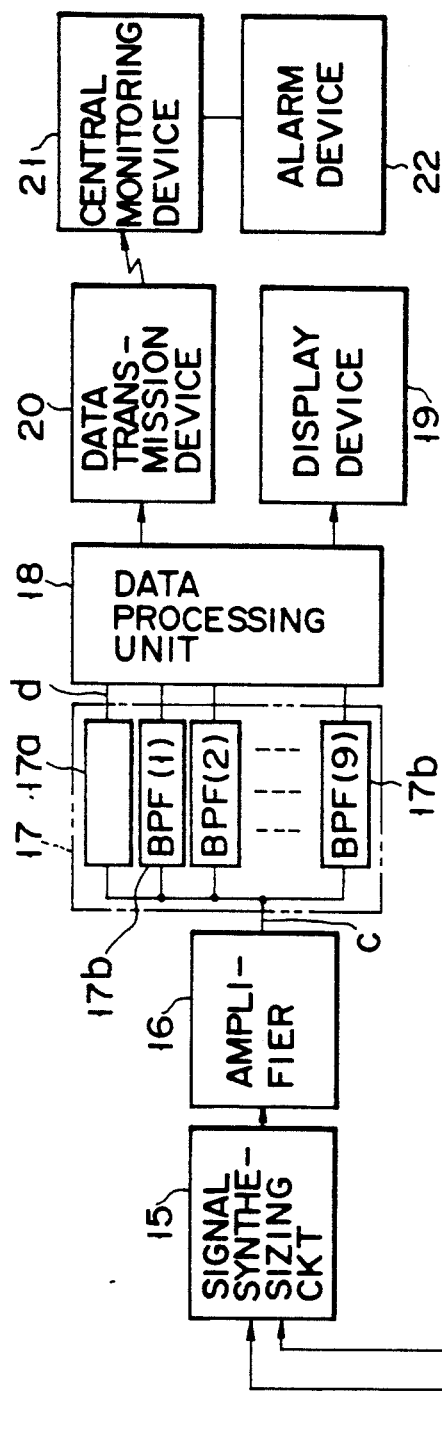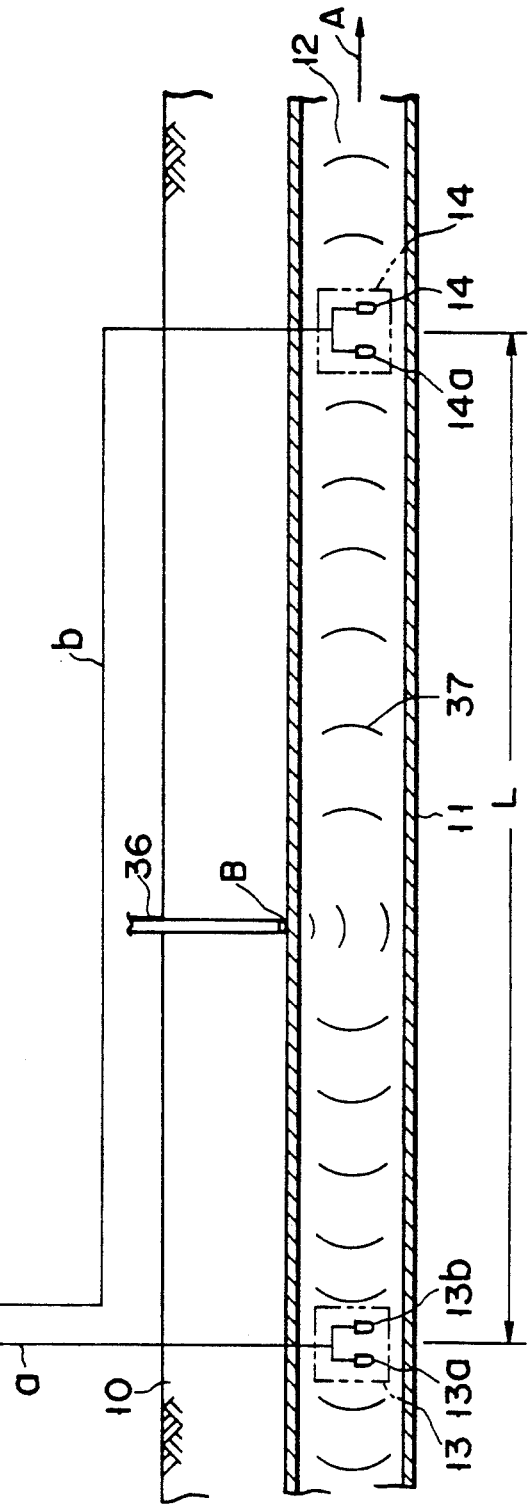
F I G. 2

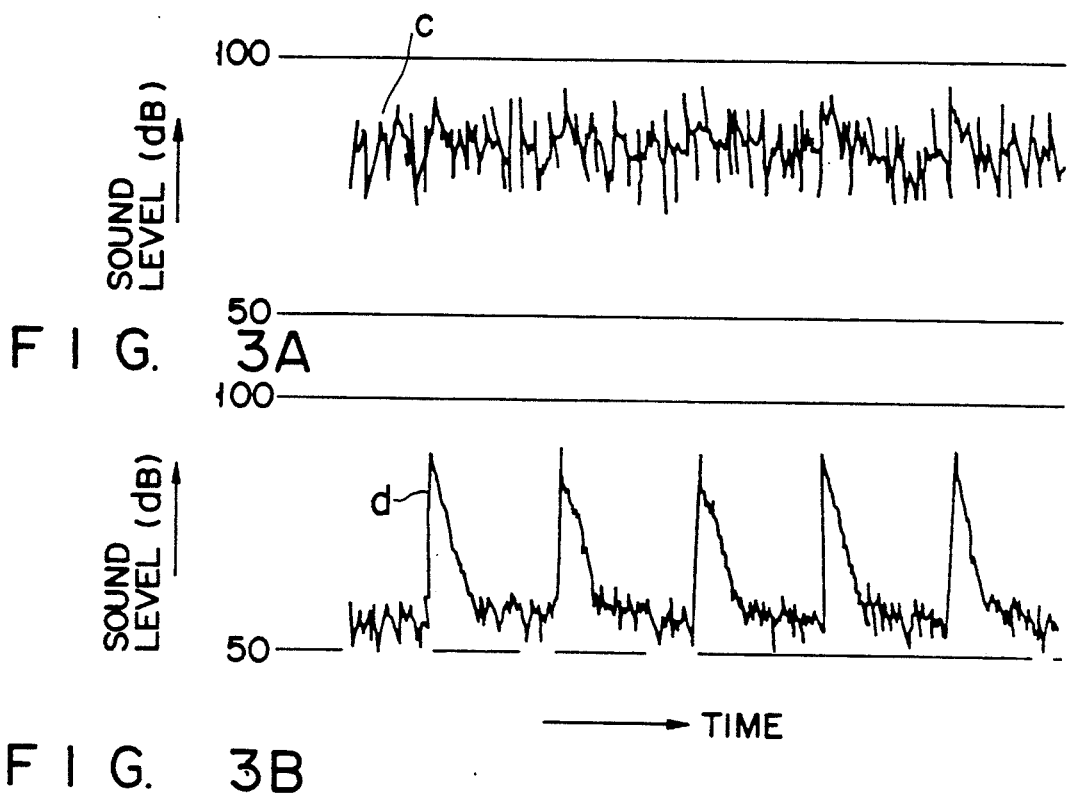
FIG. 3A
FIG. 3B
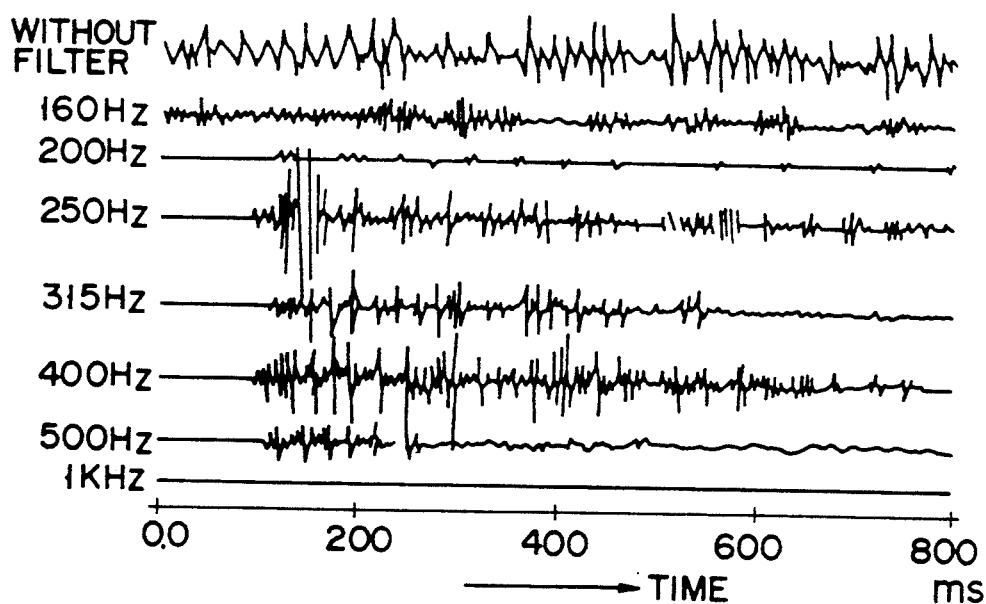
FIG. 4

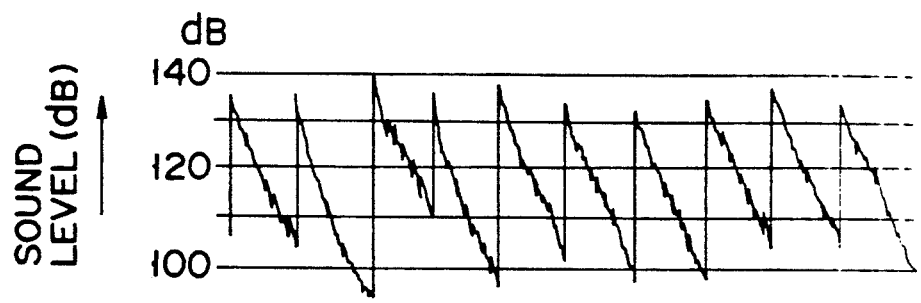
F I G. 6A
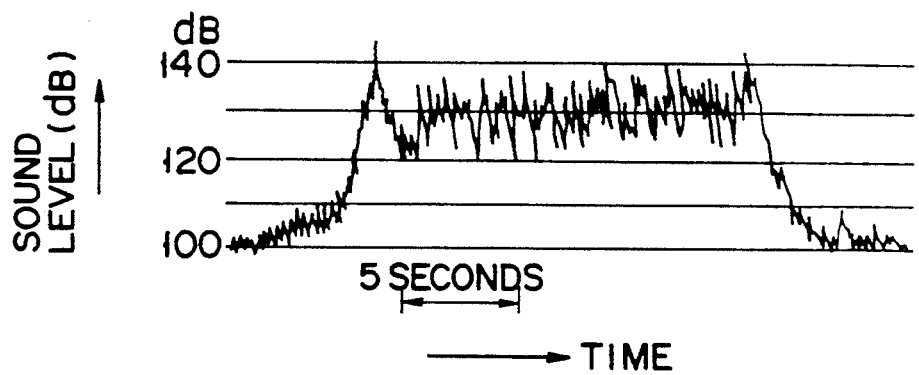
F I G. 6B
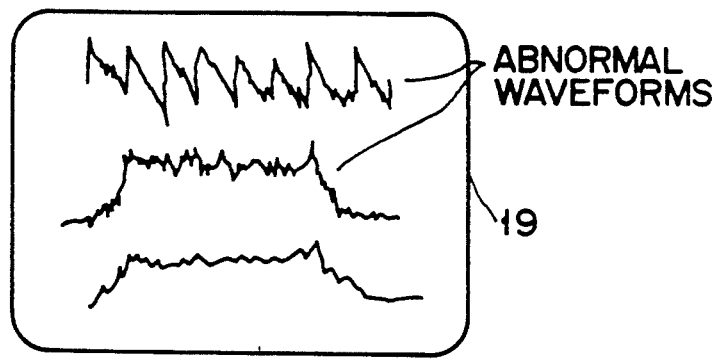
F I G. 8

ABNORMALITY MONITORING APPARATUS FOR A PIPELINE

TECHNICAL FIELD

The present invention relates to an abnormality monitoring apparatus for monitoring the occurrence of abnormality, such as an injury and leakage, on a pipeline and, in particular, to an abnormality monitoring apparatus including a plurality of detectors arranged at a plurality of places relative to the pipeline to rapidly and accurately detect the occurrence and position of an abnormal spot on the pipeline from a remote site.

The present apparatus includes a plurality of detectors arranged on a pipeline to readily identify the kind of abnormality on the pipeline, using the waveforms of sound waves detected by the detectors.

BACKGROUND ART

A pipe of pipeline is usually laid beneath the surface of the ground, buried at a location between the walls of the adjacent buildings, or arranged in a place readily inaccessible by a maintenance personnel. There sometimes occurs an abnormal spot or an injury on the pipe upon impact from an external force or a leakage of an internal fluid resulting from a corroded pipe wall. It is very cumbersome or difficult to detect occurrence of abnormality on the pipe and locate it once the pipe has been buried or laid beneath the ground surface.

Published Unexamined Japanese Patent Application No. 60-49199 discloses a piping buried with an optical fiber spirally wound thereon. This optical fiber is connected at one end to a light emitting element and at the other end to a light receiving element, time differentiating circuit, alarm circuit, etc. A light signal emitted from the light emitting element is transmitted via the optical fiber to the light receiving element where it is converted to an electric signal, which is differentiated by the time differentiating circuit. An external lateral force on the buried piping causes microbends on the optical fiber. This leads to a greater transmission loss across the full length of the optical fiber and an abrupt variation in the output signal of the time differentiating circuit. The occurrence of abnormality is thus detected.

A piping, if newly buried beneath the ground surface, may be so done at a desired location with the wound optical fiber disposed on the piping. If, on the other hand, an optical fiber cable is provided on an already buried piping, digging-out has to be done at a location around the piping, involving an unpractically larger construction work expense.

The digging is effective to the situation in which the piping is deformed over a certain ground area due to the occurrence of earthquake, local ground subsidence or upheaval, etc., but a local impact by an excavating machine, etc., on the piping and resultant occurrence of a injured spot or spots on the piping do not correspond to the location of the optical fiber cable, sometimes failing to positively detect the occurrence of abnormality on the optical fiber.

DISCLOSURE OF INVENTION

A first object of the present invention is to provide an abnormality monitoring apparatus for readily, rapidly and accurately detecting the occurrence of abnormality on a pipeline and its position from a local site.

A second object of the present invention is to provide an abnormality monitoring apparatus for readily identifying a kind of abnormality on a pipeline.

A third object of the present invention is to provide an abnormality monitoring apparatus for readily, rapidly and accurately detecting the occurrence of abnormality on a pipeline and its position and a kind of abnormality from a remote site.

In order to achieve the first object of the present invention, a plurality of detectors are arranged at a plurality of places in the axial direction of a pipeline with a predetermined distance left between the detectors to detect sound waves generated due to the presence of abnormality on the pipeline and propagating from the position of occurrence of abnormality with a fluid as a medium. A sound wave detection time difference between the detectors is found, for example, at a data processing unit where it calculates the position of occurrence of abnormality on the basis of the sound wave detection time difference and distance between the detectors.

In the present apparatus, the respective detector is comprised of a pair of sound wave sensors arranged in the axial direction of the pipeline with a very small interval left between the paired sound wave sensors. Further, the data processing unit calculates respective sound velocities at the positions of the respective detectors on the basis of a sound wave detection time difference between the paired sound wave sensors in the respective detectors. The respective distances from the positions of the respective detectors to the abnormality occurrence position are calculated using the calculated sound velocities, distance between the detectors and a sound wave detection time difference between the detectors.

In the present apparatus thus arranged, if any abnormality occurs at some place in the axial direction of, for example, a pipeline, a corresponding sound wave is generated and propagates in both the directions of the pipeline. The provision of respective detectors, for example, in the neighborhood of both ends of the pipeline enables the respective detectors to detect any abnormal sound on the pipeline. Since the distance between the detectors is already known, the position of occurrence of abnormality can be located from the sound wave detection time difference of abnormal sounds at the respective detectors, provided that the sound propagating velocity is given. When sound waves are detected at exactly the same time, it is found that the position of occurrence of abnormality is located at an intermediate position between the detectors.

Generally, the velocity of a sound wave propagating in the pipeline varies depending upon the direction in which the fluid flows through the pipeline, that is, a high speed is involved when the sound wave propagates in the same direction as that in which the fluid flows and a low speed is involved when the sound wave propagates in a direction opposite to that in which the fluid flows. Therefore, the respective distances from the positions of the respective detectors to the position of occurrence of abnormality on the pipeline can be exactly calculated as the abnormality occurrence position, using the respective sound velocity at the respective detector.

In order to achieve the object of the present invention, the present apparatus comprises the detectors as set out above, abnormal waveform memory unit for storing the waveforms of abnormal sound waves corresponding to a plurality of kinds of typical abnormality, and display device for displaying, on the same image screen, the waveform detected at the detector and waveform of the respective abnormal sound wave read out of the abnormal waveform memory unit.

It is usually possible to initially presume kinds of typical external forces on, for example, a pipeline or piping buried in the ground. That is, the kinds of abnormality are often identified from the kinds of construction works done against the buried piping. From this viewpoint, the abnormal waveform memory unit initially stores the waveforms of abnormal sound waves as generated from a plurality of kinds of typical abnormality. Since the display device displays the waveform of a respective abnormal sound and that of sound waves detected at the detectors, the monitoring personnel can readily identify the kind of abnormality by comparing both the waveforms displayed on the display device.

The frequency passband for the waveform of the detected sound wave is restricted using a bandpass filter whose frequency passband is set to 200 to 500 Hz. That is, for the frequency passband of less than 200 Hz, the noise of the fluid provides a bar to the reception of a signal and, for the frequency passband exceeding 500 Hz, a signal cannot be detected due to too great a propagation loss and, further, the S/N ratio is lowered due to the noise originating from the apparatus, etc.

Since the bandpass filter is comprised of a plurality of kinds of unit bandpass filters, it is possible to optionally select a frequency passband against the waveform of a detected sound wave and hence to display the waveform of a sound wave in the form of the most characteristic waveform. The monitoring personnel can readily identify the kind of abnormality to which the waveform of the sound wave belongs.

In order to achieve the third object of the present invention, a plurality of detectors are arranged at a plurality of places in the axial direction of the pipeline with a predetermined distance left between the detectors and can detect a respective sound wave generated due to the occurrence of abnormality on the pipeline and propagating from the position of occurrence of abnormality with a fluid as a medium. For example, a data processing unit finds a sound wave detection time difference between the detectors and calculates the position of occurrence of abnormality on the basis of the sound wave detection time difference and distance between the detectors.

Further the present apparatus includes an abnormal waveform memory unit for storing the waveforms of an abnormal sound waves corresponding to a plurality of kinds of typical abnormality and a display device for displaying, on the same image screen, the waveform of a sound wave detected at the respective detector and the respective abnormal waveform read out of the abnormal waveform memory unit.

When there occurs abnormality on the pipeline, the present apparatus calculates a respective distance from the respective detector to the position of occurrence of abnormality. The display device displays the waveform of a sound wave generated due to the occurrence of abnormality detected and typical waveforms of abnormal sounds. It is possible for the monitoring personnel to readily locate the position of occurrence of abnormality and readily identify the kind of abnormality.

BRIEF DESCRIPTION OF THE DRAWINGS

FIG. 2 is a model generally showing an arrangement of the abnormal monitoring apparatus;

FIG. 3A shows a waveform diagram before the passage of a sound wave through a bandpass filter in the abnormality monitoring apparatus;

FIG. 3B is a waveform diagram after the passage of a sound wave through a bandpass filter in the abnormality monitoring apparatus;

FIG. 4 is a waveform diagram showing respective waveforms after the passage of sound waves through respective unit bandpass filters in the bandpass filter in the present apparatus;

FIG. 6A is a waveform showing the waveform of a typical abnormal sound wave obtained by the present apparatus;

FIG. 6B is a waveform showing the waveform of another typical abnormal sound wave obtained by the present apparatus;

FIG. 8 is a view showing the display contents of a display device in the present apparatus.

BEST MODE OF CARRYING OUT THE INVENTION

An embodiment of the present invention will be explained below with reference to the accompanying drawings.

FIG. 2 is a model view showing a general arrangement of an abnormality monitoring apparatus of the present embodiment which monitors an abnormal state of a piping. The present monitoring apparatus is shown as being applied to a piping buried beneath the surface of a ground.

Figure 1:
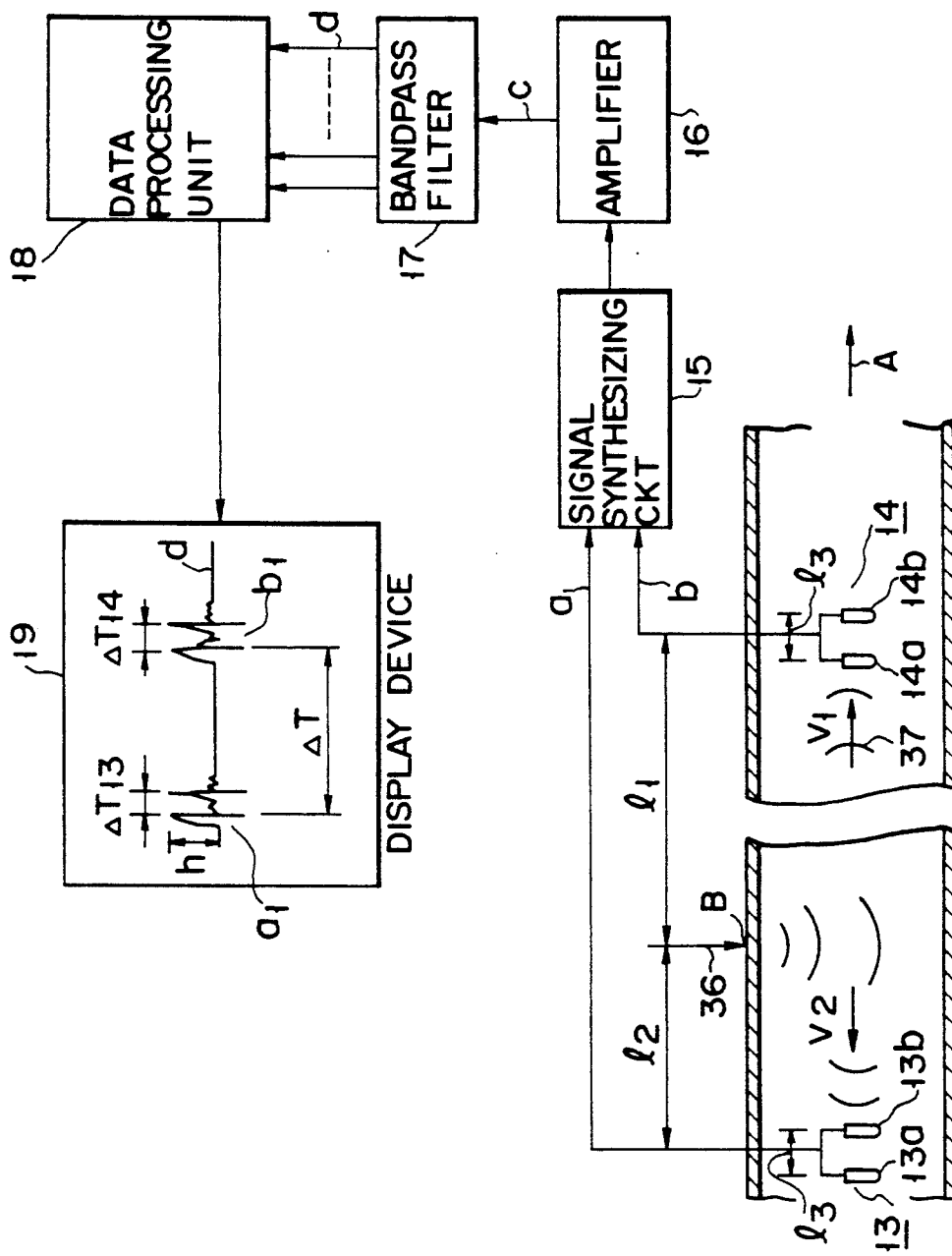
FIG. 1 is a view showing a principle of operation for calculating the position of occurrence of abnormality by an abnormality monitoring apparatus according to one embodiment of the present invention.

A fluid 12, such as a gas, flows through a piping 11, which is buried beneath the surface of the ground 10, in a direction as indicated by, for example, A in FIG. 2. A pair of detectors 13, 14 for detecting a sound wave are arranged in the piping 11 such that they are spaced apart a distance L in the axial direction of the piping 11. The detector 13 is comprised of a pair of sound sensors 13a, 13b spaced apart a distance 13 in the axial direction of the piping as shown in FIG. 1. The detector 14 is similarly comprised of a pair of sound sensors 14a, 14b spaced apart a distance 13 in the axial direction of the piping. The sensor-to-sensor distance 13 is very small compared with the distance between the detectors 13 and 14.

Even if, in place of sound sensors arranged in the piping 11, vibration sensors are located on the wall of the piping in a similar way, it is also possible to detect a sound wave because the pipe wall is vibrated by the sound wave.

A sound wave signal detected by the sound sensors 13a, 13b is supplied, as a sound wave signal a of the detector 13, to a signal synthesizing circuit 15. A sound wave signal b detected by the sound sensors 14a, 14b is supplied to the signal synthesizing circuit 15 where the sound wave signals a and b are synthesized into a new sound wave signal. The output sound wave signal of the signal synthesizing circuit 15 contains four sound waveforms as detected by the sensors 13a, 13b and 14a, 14b of the detectors 13 and 14. The sound wave signal of the signal synthesizing circuit 15 is supplied to an amplifier 16 where it is amplified as a sound wave signal c. The sound wave signal c of the amplifier 16 is supplied to a bandpass filter 17. The bandpass filter 17 comprises a non-controlling circuit 17a for allowing the input sound wave signal c to pass without being given any frequency restriction and nine unit bandpass filters (hereinafter referred to as unit BPF) 17b where frequency passbands are set to different levels. The center frequencies of the respective frequency passbands of the respective unit BPF's are set, for every ⅓ octane band frequency, over a frequency range 160 Hz to 1 KHz, such as 160 Hz, 200 Hz, 250 Hz, 315 Hz, 400 Hz, 500 Hz, 630 Hz, 800 Hz and 1 KHz.

The bandpass filter 17 serves to eliminate those frequency components in the output sound wave signal c of the amplifier 16 which result from a background noise inherent to the flow of a fluid 12 through the piping 11 and to the operation of a pressure regulator 12.

FIGS. 3A and 3B are waveform diagrams representing sound wave signals detected by the detectors 13 and 14, when, in actual practice, a periodical vibration is exerted on the piping 11, these detectors being located in a position 5 Km distance from that in which an abnormal state occurs. That is, FIG. 3A shows a sound wave signal c after it is output from the amplifier 16 but before it is input to the bandpass filter 17 and FIG. 3B shows a sound wave signal d output from the unit BPF 17 with the center frequency of the frequency passband set to 250 Hz in which case the frequency passband of the bandpass filter 17 was set to 200 to 500 Hz. From FIGS. 3A and 3B it will be appreciated that, for the sound wave signal c before being input to the bandpass filter 17, a noise waveform corresponding to the background noise produced due to the flow of the fluid 12 is superimposed over the sound waveform generated upon vibration impact but that a sound wave signal d output from the bandpass filter 17 contains only a sound waveform generated upon vibration impact, not the noise components of the background noise resulting from the flow of the fluid 12.

Since kinds of construction machinery have been known which usually cause a damage to a piping under the surface of the ground in the civil engineering works. In the case where the piping 11 suffers a vibration impact during the use of the machinery, it is possible to estimate the property of a sound wave propagating in the piping upon vibration impact. The frequency of that sound wave is of the order of 200 to 500 Hz. Of the frequency components of the sound wave received, only those of the aforementioned frequency band range can be passed and the other noise components be eliminated, largely improving an S/N ratio. For the frequency bandpass of less than 200 Hz, the fluid noise offers a bar to the reception of a signal of interest. For the frequency bandpass exceeding 500 Hz, a signal involved cannot be detected due to an excess propagation loss and, further, the S/N ratio is lowered due to a noise caused by, for example, the machinery, FIG. 4 shows a comparison between the output sound waveform of the non-controlling circuit 17 and the respective sound waveform of the respective unit BPF 17b with the frequency passband so set as set out above, the non-controlling circuit 17a imposing no restriction to the passage of a frequency.

Since the attenuation characteristic of the sound wave propagating in the piping 11 varies depending upon the propagating distance and frequency, it is difficult to unconditionally determine those passed frequencies of the whole bandpass filter 17 for obtaining an optimal S/N ratio. However, a sound wave resulting from an abnormal state on and in the piping can be positively detected, in spite of its source and its propagating distance, by selecting an optimal one of a plurality of unit PBFs 17b of different frequency passbands each.

In the underground piping through which a gas passes, for example, the frequency passband is optimally 200 to 500 Hz, but, in the oil pipeline, etc., in the field, the frequency passband becomes a broader range of 200 to 2 KHZ optimally because the pipeline 11 sometimes undergoes a direct impact. In this situation, a measuring bandpass may be made broader by increasing the number of unit BPFs 17b.

Respective sound wave signals d which are output from the non-controlling circuit 17a and BPF's 17b in the bandpass filter 17 are supplied to a data processing unit 18 comprised of, for example, a microcomputer. The data processing unit 18 subjects received sound signals d to various data proceedings to determine whether or not any abnormal state occurs on the piping and, when the abnormal state occurs, calculates the position where it occurs.

The data processing unit 18 enables the detected sound signals d, presence or absence of the abnormal state, the location of that state, and the kind of abnormality judged by a monitoring personnel to be displayed, if required, on a display device 19 using, for example, a CRT display, and to be transmitted to a central monitoring device 21 via a data transmission device 20. Upon receipt of any abnormality occurrence information, the central monitoring device 21 informs it, together with its location and its kind, and gives an alarm via an alarm device 22, to another monitoring personnel.

Figure 5:
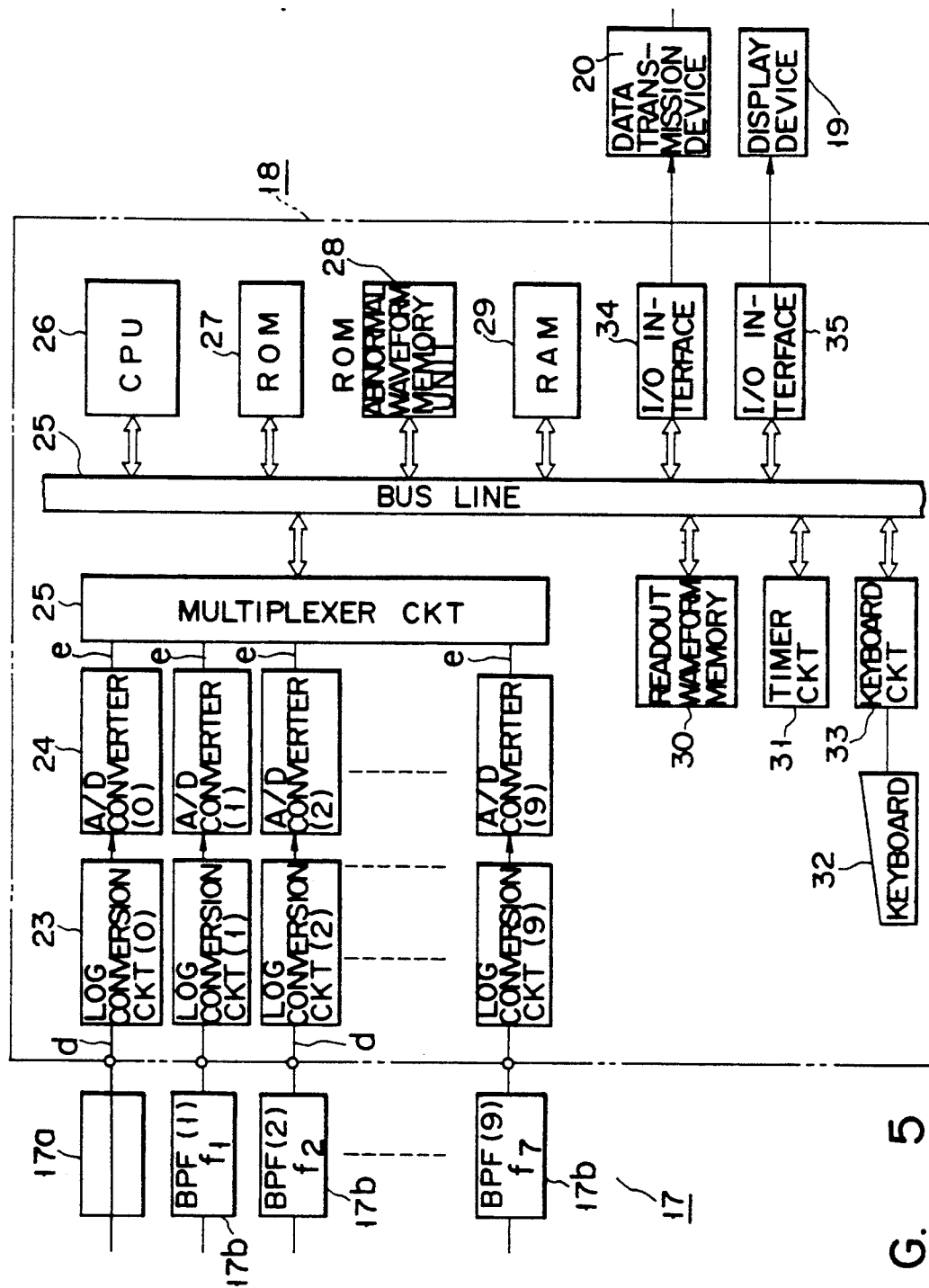
FIG. 5 is a block diagram diagrammatically showing a data processing unit in the present apparatus.

The data processing unit 18 is so constructed as shown in FIG. 5. The respective sound signals d of the non-controlling circuit 17a and BPF's 17b in the bandpass filter 17 are converted by a LOG (logarithm) converter 23 to a decibel value (dB). The values of the converter 23, after being sampled with a given frequency, are converted by an A/D converter 24, to a digital sound wave signal e. The respective digital sound wave signals are supplied to a multiplexer circuit 25. A multiplexer circuit 25 receives the respective digital sound wave signals e in the same timing and sends them to a bus line 25.

To the bus line 25 are connected a CPU (central processing unit) 26 for performing various calculation proceedings, ROM 27 stored with various fixed data, such as a control program, abnormal waveform memory unit 28, such as a ROM, stored with a plurality of kinds of typical abnormal waveforms, RAM 29 for temporarily storing various variable data associated with the abnormality occurrence position calculation, and a readout wave memory 30 temporarily stored with the wavelengths of the respective sound signals d which are read through the multiplexer circuit 25. To the bus line 25 are further connected a timer circuit 31 for controlling the readout time intervals $T_M$ of the sound wave signals e, keyboard circuit 33 for entering key signals as various operation instructions from a keyboard 32 by the monitoring personnel, I/O interface 34 for sending various kinds of transmission data to the data transmission device 20, I/O interface 35 for sending various display data to the display device 19.

The abnormal wavelength memory unit 28 stores respective typical abnormal waveforms as shown, for example, in FIGS. 6A and 6B. That is, FIG. 6A shows the waveform of sounds detected by the detectors 13 and 14 when a road surface beneath which the piping 11 is buried is periodically dug out by a back hoe- FIG. 6B shows a sound waveform detected by detectors 13 and 14 when a road surface beneath which the piping 11 is buried is continuously dug out. The abnormality sometimes occurs due to the digging out of a construction machine, such as the aforementioned back hoe and vibratory hammer, and to the leakage of a fluid resulting from an injured wall of the piping. In this way, different sound waveforms emerge, depending upon the kinds of abnormality.

The procedure for detecting the occurrence of abnormality caused by an impact of the vibratory hammer's tip 36 against a spot on the outer surface of the piping 11 will be explained below with reference with FIG. 1.

when an impact is applied to the outer surface of the piping 11, then a sound wave 37 is transmitted through the piping 11 with a fluid 12 as a medium, and propagates in the directions of the detectors 13 and 14. In the case where the fluid 12 flows in the direction A, the velocity (propagation velocity) V1 of sound propagating in the direction of the detector 14 is greater than the sound velocity (propagation velocity) V2 of sound propagating in the direction of the detector 13.

Given that $\Delta T14$ represents a time difference detected by the pair of sound wave sensors 14a, 14b in the detector 14, the sound velocity V1 is given by $$V1 = l3/\Delta T14 \qquad (1)$$

where l3 represents the distance between the sound wave sensors 14a and 14b.

Similarly, the velocity V2 is given by $$V2 = l3/\Delta T13 \qquad (2)$$

where $\Delta T13$ represents a time difference detected by the pair of sound wave sensors 13a, 13b in the detector 13.

With t1, t2 representing the times at which respective sound waves 37 are detected by the detectors 14 and 13, $$\Delta T = t1 - t2 \qquad (3)$$

where $\Delta T$ denotes a difference at times t1 and t2 at which the sounds are detected at the detectors 14 and 13 as actually detectable values.

In Equation (3), the sound wave detection time difference $\Delta T$ becomes positive when the detector 13 detects the sound wave 37 earlier than the detector 14. Through a simpler consideration, the distances l1 and l2 from an abnormal spot B to the detectors 14 and 13 can be found from Equations (4) and (5) given below $$l1 = V1 (L + \Delta T \cdot V2)/(V1 + V2) \qquad (4)$$

$$l2 = V2 (L - \Delta T \cdot V1)/(V1 + V2) \qquad (5)$$

The abnormal spot B can be found by calculating Equations (4) and (5) by the data processing unit 18.

Figure 7:
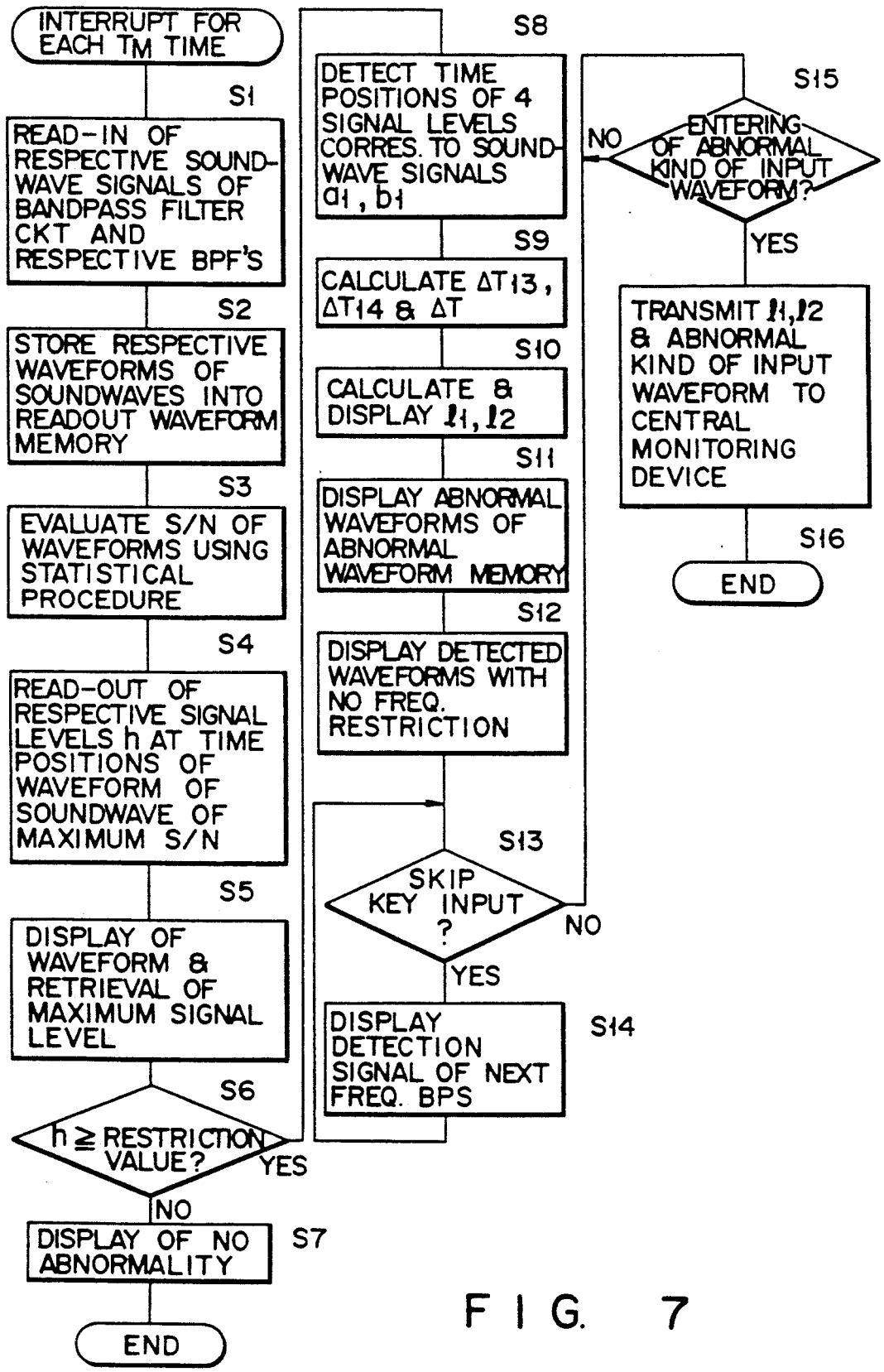
FIG. 7 is a flowchart showing the operation of the data processing unit in the present apparatus.

CPU 26 in the data processing unit 18 is program-designed that, upon receipt of an interrupt signal from the timer circuit 31 for every read-out time interval $T_M$, it executes a determination support processing for determining the presence or absence of any abnormal spot, its position and its kind in accordance with a flowchart shown in FIG. 7.

When a time interrupt signal is input from the timer circuit 31 to CPU 18, respective digital sound wave signals e which are output from the respective A/D converters 24 after their original signals pass through the non-control circuit 17 and respective BPF's 17b in the bandpass filter 17 and then through the respective LOG converters 23 are read into CPU 18 through the multiplexer circuit 25 for a predetermined time T corresponding to time necessary for waveform analysis (step S1). The waveforms of the read-in sound wave signals e are stored in the readout waveform memory 30 at step S2.

At step S3, the S/N ratios of the respective sound waveforms stored in the readout waveform memory 30 are evaluated through the use of a statistical procedure for finding, for example, an autocorrelation function - step S3. At step S4, CPU reads out a signal level h at respective times of the sound waveforms corresponding to an evaluated maximal S/N ratio.

At step S5, the sound waveform corresponding to the read-out maximal S/N ratio is displayed on a display device 19. Further, a maximal value of the signal level h at the respective time position is retrieved. If the maximal value of the signal level h detected does not exceed a predetermined restrictive value at step S6, CPU 26 determines that there is no abnormal waveform and displays a massage on display device 19 indicating that there is no abnormal state on the piping - step S7.

Further, when the maximal value of the signal level exceeds a restrictive level, CPU determines that there occurs an abnormal state on the piping. Control goes to step S8. At step S8, CPU detects four time positions corresponding to abnormal sound waveforms generated upon impact on the piping and detected out of the sound waveforms a1, b1 by the sound wave sensors 13a, 13b and 14a, 14b of the detectors 13 and 14, respectively.

At step S9, CPU calculates, from the detected four time positions, sound wave detection time differences $\Delta T13$, $\Delta T14$ of the respective sound wave sensors and a sound wave detection time difference $\Delta T$ of the detectors. At step S10, CPU calculates distances l1, l2 from the abnormal spot B to the detectors 14 and 13 - step S10.

Upon termination of the position calculation processing on the position of the abnormal spot on the piping, CPU reads out the respective abnormal sound waveforms (see FIGS. 6A and 6B) from the abnormal waveform memory 28 - step S11. At step S12, CPU reads out a sound waveform of those respective sound waveforms stored in the readout waveform memory 30, that is, a sound waveform corresponding to a sound wave signal d delivered from the non-controlling circuit 17a (a circuit providing no frequency restriction in the bandpass filter 17), and displays it, together with abnormal sound waveform, on the display device 19. For ease in comparison between the respective sound waveforms, they are displayed with the same contracted time width shorter than upon calculation of the distances l1, l2.

If a skip key signal is input from the keyboard 32 through the keyboard circuit 33, CPU determines the next unit BPF 17b as being selected by the operator - step S13. At step S14, CPU eliminates the sound waveform of the non-controlling circuit 17a or unit BPF 17b displayed on the display device 19 and then reads out that sound waveform corresponding to the unit BPF 17b of higher frequency passband from the readout waveform memory 30 and displays it on the display device 19.

If, at step S15, a key operation for designating the kind of abnormality is made on the keyboard 32 without operating the skip key, CPU transmits information of abnormality occurrence, its positions l1, l2 and its kind to the central monitoring device 21 via the data transmission unit 20.

If abnormality cannot be determined as belonging to one kind, then another key-in operation is effected for another kind of abnormality, In a sound wave signal d of optimal S/N ratio obtained by eliminating noise components from its original signal at the non-controlling circuit 17a and respective unit BPF 17b in the bandpass filter 17, CPU measures a sound wave detection time difference $\Delta T$ represented by the sound waveforms a1 and b1 corresponding to the sound wave signals a and b delivered from the detectors 13 and 14, as well as sound wave detection time differences $\Delta T14$ and $\Delta T13$ at the sound wave sensors 14a, 14b and 13a, 13b in the detectors 14 and 13, as shown in the display device 19 in FIG. 1. CPU calculates, from these respective values, sound velocities V1, V2 at the locations of the detectors 14, 13 and then calculates final distances l1 and l2 at the abnormal spot B through the use of the velocities V1 and V2.

If there is no abnormality, the sound wave signals a, b detected at the detectors 13, 14 contain only those noise components of a background noise in the fluid 12, not those sound signals of a sound 37 which would otherwise be generated due to an abnormal spot on the piping. Those noise components, though lower in their level, are eliminated by the bandpass filter 17 and the level of the sound wave signal d input to the data processing unit 18 is reduced below a restrictive level. In this way, the data processing unit 18 determines that there occurs no abnormality.

Although the respective sound velocities constantly vary depending upon the flow direction, flow velocity, component variation and flow variation of the fluid 12, the abnormality monitoring apparatus of the present invention can also measure the sound velocity and largely enhance the accuracy with which the position of the abnormal spot B is calculated.

As already set out above, those frequency components of sound waveforms generated due to the occurrence of an abnormal spot largely vary depending upon the kinds of abnormality involved. Since the bandpass filter 17 comprises the non-controlling circuit 17a and plurality of unit BPF's 17b and selects a sound waveform of a maximal S/N ratio each time, it is possible to grasp the presence or absence of abnormality and its spot or position, under the best condition at all times, irrespective of the kinds of abnormality.

If any abnormal spot is produced, it is possible to promptly grasp its occurrence or its position. It is also possible to largely improve the accuracy with which such abnormality is detected, to accurately find the position of the abnormal spot and to largely improve the reliability of the apparatus as a whole, when compared with a system utilizing conventional optical fibers.

Since the detectors 13, 14 are arranged one at each end of the piping 11, it is not necessary to dig the ground surface to see where to locate an abnormal spot on the whole length of an underlying piping. This offers a greater saving in construction costs for installing the abnormality monitoring apparatus.

Vibrations caused by an injured spot or spots on the pipe 11 directly propagate across the thickness of the piping 11. The vibration energy suffers attenuation, such as the earth and sand around the outer surface of the piping and corrosion-resistant coating. In view of its greater attenuation, however, the injured spot cannot be detected on the piping at a far site and it is only possible to detect it so long as it is located at near site on the piping.

The energy of a sound wave propagating in the flow of a fluid is not influenced by the earth and sand. It has been found that the frequency band of the order of several Hz to several KHz in particular has the property of less damping and involves a greater abnormal sound with an increasing fluid pressure to enhance a propagation characteristic. This enables a sound wave to be transmitted over a long distance. If the detectors 13 and 14 are provided on the piping with a longer distance left as the distance L therebetween, it is possible to monitor an abnormal spot on the greater length of the piping with less number of detectors 13 and 14. Monitoring can be achieved for the presence of an abnormal spot on the piping with the detectors set at a distance L of about 10 to 15 Km, depending upon the level of a sound wave generated due to an abnormal site on the piping.

Upon occurrence of any abnormal spot on the piping, the waveform of a sound wave 37 propagating in the piping greatly differs in accordance with the kinds of abnormality. Typical abnormal sound waveforms are initially stored in the abnormal waveform memory unit 28. These waveforms, together with the waveforms received from the detectors 13 and 14, are simultaneously displayed on the display device 19. The monitoring personnel can make a comparison between the two and readily infer which abnormal sound waveform the detected sound waveform belongs to. By doing so, it is possible to readily Judge the kinds of abnormality.

If the kind of abnormality cannot be identified by a single comparison, a sound waveform passing through the unit BPF 17b corresponding to the next bandpass frequency is displayed by operating a skip key. The monitoring personnel can make a similar comparison with a sound waveform of a most typical type or a best S/N ratio displayed on the display device. As a result, the kind of abnormality can promptly and positively be identified.

Figure 9:
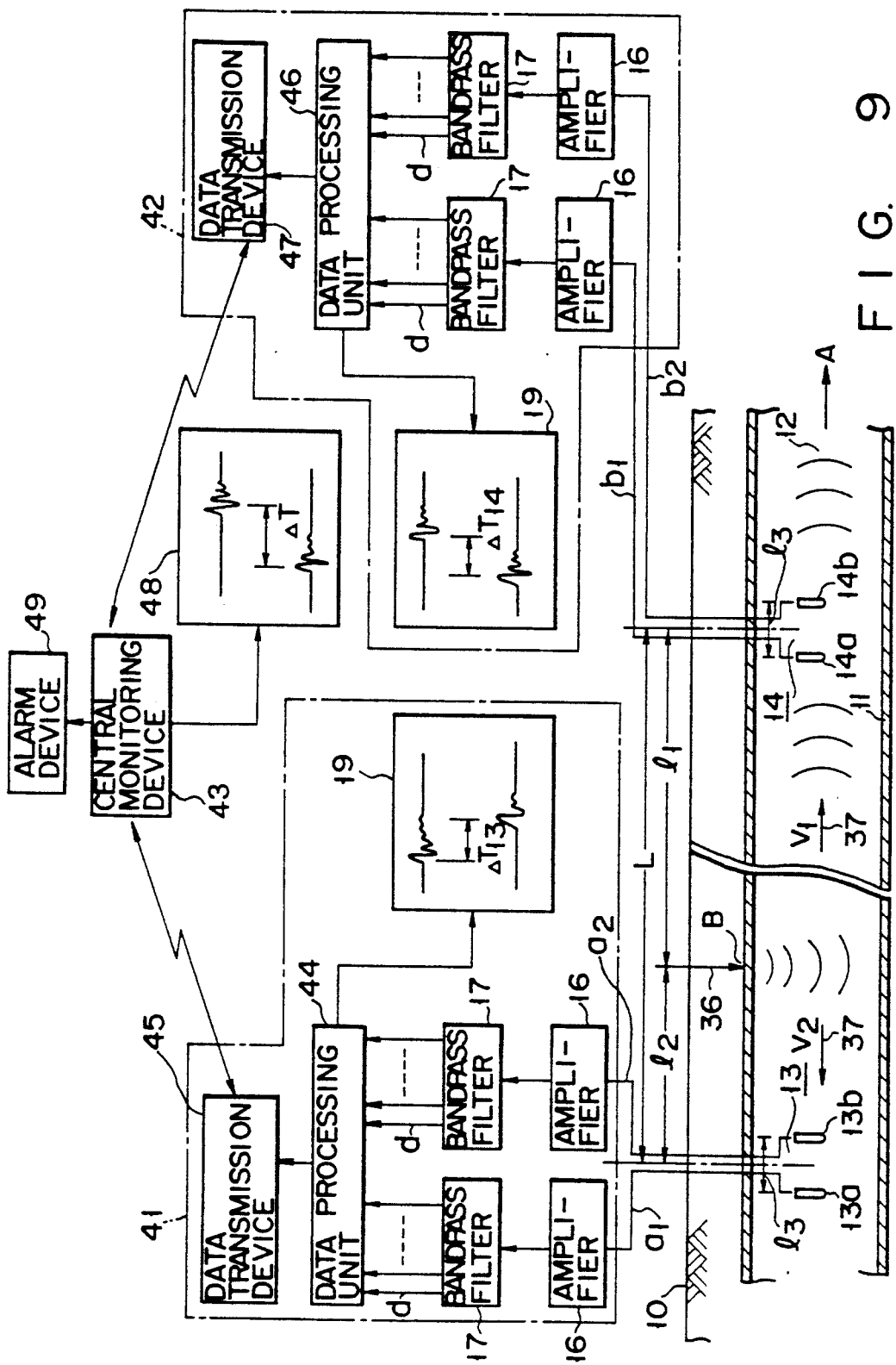
FIG. 9 is a model diagram generally showing an arrangement of an abnormality monitoring apparatus according to another embodiment of the present invention.

FIG. 9 is a view diagrammatically showing an arrangement of an abnormality monitoring apparatus according to another embodiment of the present invention. In this embodiment, the same reference numerals are employed to designate parts or elements corresponding to those shown in FIGS. 1 and 2 and further explanation is, therefore, omitted.

Generally, a pipeline for petroleum, gas, etc., extends over a distance of several hundreds of Kms. In the case where a plurality of detectors on the piping 11 are connected to special signal lines, it is necessary to lay down new signal lines along the piping 11 and hence to spend lots of memory on them. In this embodiment, associated detectors 13, 14 on the piping are not connected to each other and, instead, terminal devices 41 and 42 are provided in the neighborhood of the detectors 13 and 14 and have the function of detecting abnormality on the piping. A central monitoring device 43 is connected to the respective terminal devices 41 and 42 through a wireless communication channel or a data communication channel to calculate the position of an abnormal spot B on the piping and determine the kind of its abnormality.

In this embodiment, a pair of sound wave sensors 13a, 13b in the detector 13 detect sound wave signals a1 and a2 and are input to respective bandpass filters 17 after they have been amplified by corresponding amplifiers 16 in the terminal device 13 without being subjected to signal synthesis. The bandpass filter 17 is of the same type as that shown in FIG. 5. Respective sound wave signals d are output from a non-controlling circuit 17a and unit BPF's 17b in the respective bandpass filter 17 to a data processing unit 44. A display device 19 is connected to the data processing unit 44 comprised of one type of microcomputer. The data processing unit 18, like that shown in FIG. 5, performs data processing on the respective sound wave signals d, that is, those signals input from the respective bandpass filters 17 without being subjected to frequency restriction, and on the respective frequency-restricted sound wave signals, and determines whether or not there occurs an abnormal spot on the piping. The data processing unit 44 measures, upon occurrence of an abnormal spot on the piping, its detection time t1 and calculates a sound velocity V1 from a time difference $\Delta T13$ at which such abnormality is detected between the respective sound wave sensors 13a, 13b. The calculation is carried out in accordance with the aforementioned procedure. The respective data V1 and V1 as well as the respective waveforms of the respective sound wave signals d delivered from the bandpass filters 17 are transmitted to a central monitoring device 43 via a data transmission device 45. In this connection it is to be noted that, in the absence of any abnormality, nothing is transmitted to the central monitoring device 43.

Sound wave signals b1 and b2 detected by a pair of sound sensors 14a, 14b in the other detector 14 are individually amplified by amplifiers 16 in the terminal device 42 and input to the bandpass filters 17. Respective sound wave signals d output from the respective bandpass filters 17 are input to a data processing unit 46. A display device 19 is connected to the data processing unit 46. The data processing unit 46 performs various data processings on the sound wave signals d input from the respective bandpass filters and determines whether or not there is any abnormal spot or spots on the piping. If such abnormality occurs, the data processing unit 46 measures its detection time t2 and calculates its detection time difference $\Delta T14$ between the sound wave sensors 14a and 14b in accordance with the aforementioned procedure. The data t2 and V2, as well as respective waveforms of respective sound wave signals d output from the respective bandpass filters 17, are transmitted via a data transmission device 47 to the central monitoring device 43. In the absence of any abnormal spot on the piping, nothing is transmitted to the central monitoring device 43.

Respective display devices 19 of the respective terminal devices 41 and 42 are not necessarily required and may be omitted.

The central monitoring device 43 is comprised of one type of microcomputer and has a display device 48 and alarm device 49. The central monitoring device 43 calculates, upon receipt of the respective data t1, t2, V1, V2 and respective sound waveforms from the respective terminal devices 41 and 42, the distances l1 and l2 leading to the position of an abnormal spot on the piping, by Equations (3), (4) and (5), based on the respective data t1, t2, V1 and V2. The central monitoring device delivers information on the generation and position of the abnormal spot B to the alarm device 49 to inform the monitoring personnel of the occurrence of that abnormality.

The central monitoring device 43 includes an abnormal waveform memory unit having the same arrangement as the abnormal waveform memory unit 28 and storing a plurality of typical abnormal sound waveforms. A display device 48 displays the waveforms of the respective sound wave signals d received from the respective terminal devices 41 and 42, that is, those sound wave signals d, restricted or not restricted by the bandpass filter 17 in their frequency, as well as the waveforms of the abnormal sounds of known types read out of the abnormal waveform memory unit. Informed of the occurrence of abnormality by the alarm device 49, the monitoring personnel is prompted to determine what kind of abnormality occurs on the piping.

In the thus arranged abnormal monitoring apparatus, only the terminal devices 41 and 42 are arranged at the positions of the detectors 13 and 14. The sound waveforms of the sound signals obtained at the terminal devices 41 and 42, as well as respective data necessary to locate the position of the abnormal spot B, are transmitted to the central monitoring device 43 through a wireless channel. It is only necessary to check for the kinds of abnormality at the central monitoring device 43. The monitoring personnel has only to reside in the central monitoring device 43, not at the locations of the terminal devices 41 and 42.

In this embodiment, those sound wave signals a1, a2, b1, b2 detected at the sound wave sensors 13a, 13b, 14a, 14b in the detectors 13, 14 pass through their own signal processing circuits to the data processing units 44, 46. Therefore, it is possible to obtain their own independent sound wave signals d. Comparison is made between the sound wave signals d to gain abnormality detection time differences $\Delta T13$, $\Delta T14$. Since the sound wave signals are not synthesized as shown in FIG. 1, even if the detection time differences at the respective sound wave sensors 13a, 13b, 14a, 14b become smaller due to, for example, the occurrence of abnormality in a continuous mode, the abnormality detection time differences $\Delta T13$ and $\Delta T14$ can positively be detected without causing an overlap between the adjacent waveforms. Thus, the distance Z3 can be made smaller with respect to the sound wave sensors 13a, 13b and 14a, 14b.

Further, since the sound signals a1, a2, b1, b2 detected at the sound wave sensors 13a, 13b, 14a, 14b are independently input to the data processing units 44, 46, it is possible to readily judge that either one of the sound sensors has detected an abnormal sound wave earlier than the remaining sound sensor. That is, it is possible to more readily Judge the direction in which an abnormal site on the pipe is located.

The present invention is not restricted to the aforementioned embodiments. Although, in the apparatus of the embodiment, the bandpass filter 17 has been explained as comprising the non-controlling circuit 17a and nine BPF's 17b of different center frequencies at their frequency bandpasses, a single bandpass filter may be provided, instead, which has a frequency bandpass of 200 to 500 Hz substantially corresponding to the frequency of a sound wave caused by an impact of vibration and propagating in the piping. The restriction of the frequency passband can prevent an entrance of a fluid noise (background noise) of less than 200 Hz which provides a bar to the reception of a signal of interest. For a frequency exceeding 500 Hz, no signal emerges because of too great a propagation loss, initially preventing a fall in an S/N ratio resulting from a noise from the apparatus, etc.

Although, in the embodiment, the detectors 13 and 14 are arranged in the piping 11, they may be arranged on the outer surface of the piping 11 since vibration is caused across the tube wall by a sound wave propagating in the piping 11.

We claim:

1. An abnormality monitoring apparatus for identifying a type of abnormality on a pipeline through which a fluid passes, comprising:

detector means, arranged in the pipeline, for detecting a sound wave generated at a position of occurrence of an abnormality and propagating with the fluid as a medium;

abnormality waveform memory means for storing abnormal waveforms of sound waves caused by a plurality of typical abnormalities;

a plurality of unit bandpass filters, having respective different frequency passbands, each for eliminating a noise component generated by the fluid in the pipeline and contained in the sound wave detected by said detector means, and outputting a filtered sound wave; and display means for displaying, on a same image screen, a waveform of the filtered sound wave which is output by at least one of said plurality of unit bandpass filters, and an abnormal waveform read out of said abnormality waveform memory means; and wherein respective frequency passbands of said unit bandpass filters have center frequencies which are set for each ⅓ octave band frequency within a frequency range of from 200 Hz to 500 Hz.

* * * * *

UNITED STATES PATENT AND TRADEMARK OFFICE
CERTIFICATE OF CORRECTION

PATENT NO. : 5,333,501

DATED : August 2, 1994

INVENTOR(S) : Mori, Kunihiro, et al

It is certified that error appears in the above-identified patent and that said Letters Patent is hereby corrected as shown below:

Title page:

Section [19], "Okada et al." should be --Mori et al.--

Section [75], Inventors, before "Masumi Okada"
        insert: --Kunihiro Mori, Kamakura;--

Signed and Sealed this

Seventh Day of February, 1995

Attest:

BRUCE LEHMAN

Attesting Officer      Commissioner of Patents and Trademarks